United States Patent
Koizumi 4,073,575
Feb. 14, 1978

[54] OBJECTIVE FOR VIDEO DISKS

[75] Inventor: Toshimichi Koizumi, Sagamihara, Japan

[73] Assignee: Olympus Optical Co., Ltd., Tokyo, Japan

[21] Appl. No.: 685,675

[22] Filed: May 12, 1976

[30] Foreign Application Priority Data

May 15, 1975 Japan .................................. 50-57798

[51] Int. Cl.² ...................... G02B 11/32; G02B 11/34
[52] U.S. Cl. .................... 350/214; 350/215; 350/175 ML

[58] Field of Search ................ 350/175 MZ, 215, 214, 350/220

[56] References Cited

U.S. PATENT DOCUMENTS 3,592,530   7/1971   Klein ..................... 350/220

*Primary Examiner*—Conrad J. Clark
*Attorney, Agent, or Firm*—Cushman, Darby & Cushman

[57] ABSTRACT

An objective for video disks comprising six lens components of single lenses for which the numerical aperture on the recording surface side is large, working distance is large and aberrations especially spherical aberration and coma are corrected favorably.

4 Claims, 10 Drawing Figures

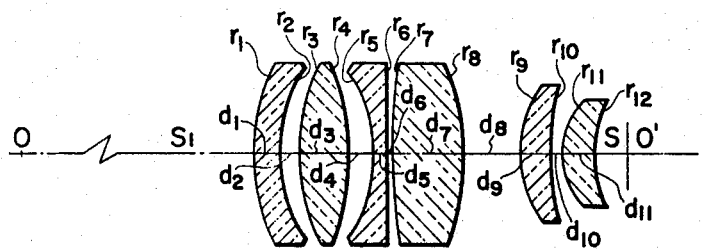
FIG. 1
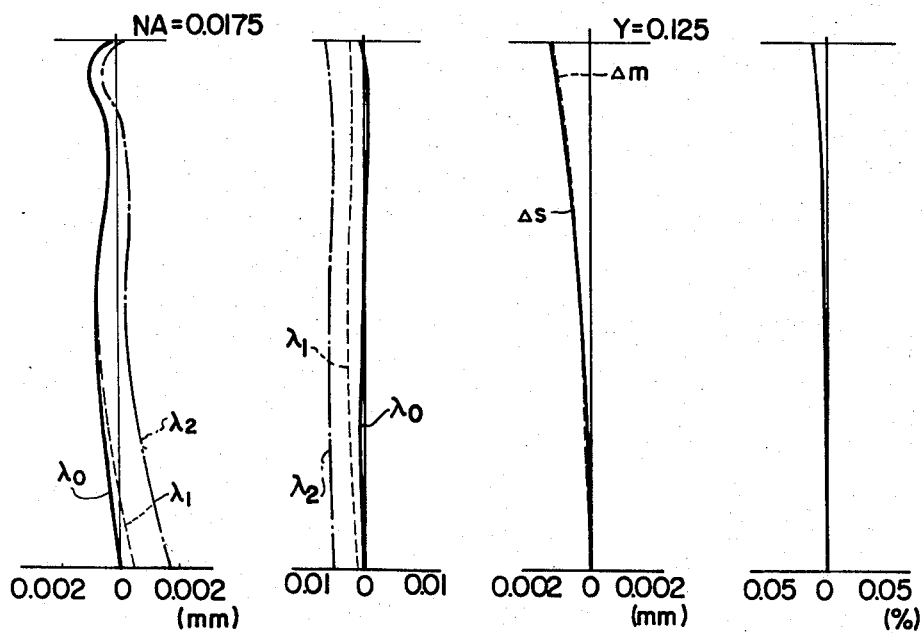
FIG. 2A SPHERICAL ABERRATION
FIG. 2B OSC'
FIG. 2C ASTIGMATISM
FIG. 2D DISTORTION FIG. 3A   FIG. 3B   FIG. 3C   FIG. 3D
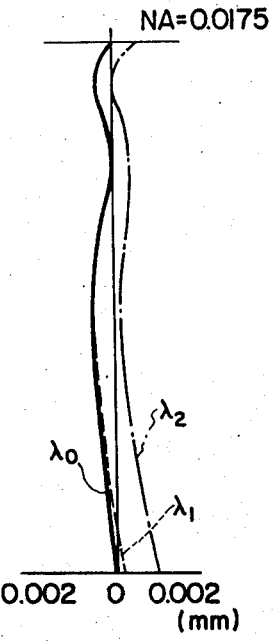
SPHERICAL ABERRATION
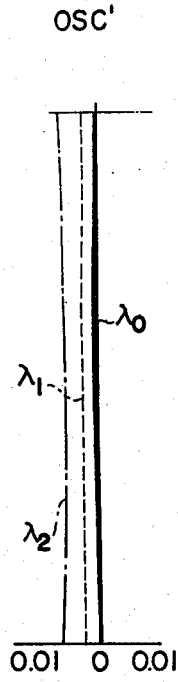
OSC'
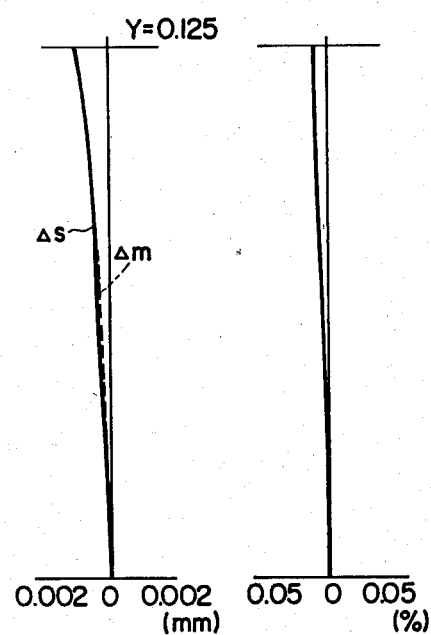
ASTIGMATISM   DISTORTION
FIG. 4
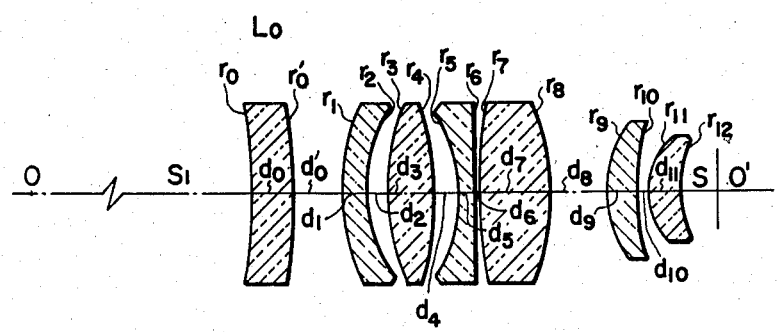

OBJECTIVE FOR VIDEO DISKS

BACKGROUND OF THE INVENTION a. Field of the Invention

The present invention relates to an objective for video disks and, more particularly, to an objective for video disks with high reduction ratio to be used for recording the modulated signals when making a master disk of photoelectric video disks.

b. Description of the Prior Art

For recording of modulated signals for making the master disk of photoelectric video disks, an objective designed exclusively for said purpose has not yet been known and, therefore, microscope objectives have been generally utilized for the purpose. Due to the fact that a single wavelength in the range of 435.8 nm (g line) to 486.1 nm is used as the recording signal wavelength for recording of modulated signals, it was possible to obtain recording results of somewhat satisfactory level even when such microscope objectives are used. However, microscope objectives have many cemented lens surfaces therein and, moreover, their chromatic aberration is corrected in respect to rays in the range of visible radiation. Therefore, by microscope objectives, it is impossible to record the signals with high accuracy because of the influence of aberrations. Especially when a ray in ultraviolet range (for example, a ray of wavelength 351 nm) is used for the purpose of high-density recording, absorption of light by the binding agent used on said cemented surface occurs in addition to influence of chromatic aberration and, consequently, transparency decreases.

Regarding the performance of objectives for recording, the following properties are especially required: (1) transparancy should be high for rays up to the near ultraviolet radiation or up to the ultraviolet radiation, (2) the resolving power should be high, (3) influence of deffracted rays other than the zero order should be minimized, and (4) contrast of the image should not decrease.

To satisfy the requirement (1) out of the above, it is necessary to select a proper glass material and to prevent absorption of light by the binding agent on the cemented surface. As for the requirement (2), it is necessary to make the numerical aperture as large as possible. As for requirements (3) and (4), it is necessary to correct aberrations favourably and to minimize spherical aberration and coma especially. As for the requirement (4), it is further required to prevent flare. When the objective has a cemented surface, condition of cementing should be taken into consideration in addition to transparency, flare, etc. Because, if the cemented condition of the cemented surface is not good, noise corresponding to the cemented condition will be recorded together with the modulated waves. Moreover, as the incident light is converged into a fine beam, energy of light which passes through a unit area of respective lens surfaces is extremely large and, consequently, disconnection of cemented surface may be sometimes caused.

A master disk for recording is made of a base disk of metal, glass, etc. coated with a light-sensitive agent such as "Photo-resist". The surface of said light-sensitive agent is exposed to the modulated light which passed through and converged by the objective. In case of modulated laser beam, the beam which reaches the surface of light-sensitive surface is converged to a diameter of 1 $\mu$ or less. Therefore, temperature of the portion exposed to the beam becomes very high and the light-sensitive agent will be evaporated. If the evaporated matter sticks to the objective, contrast of image and resolving power of the objective will decrease.

SUMMARY OF THE INVENTION

It is, therefore, a primary object of the present invention to provide an objective for video disks comprising single lenses only and, therefore, not having a cemented lens surface for which the numerical aperture on the recording surface side is large and, moreover, for which the working distance is comparatively large.

The objective for video disks according to the present invention is a lens system of six-component six-element lens configuration comprising single lenses which are divided into a front lens group and rear lens group by providing a large airspace between said front and rear lens groups. Said front lens group comprises a first, second, third and fourth lens components, said first lens component being a negative meniscus lens having a convex surface of positive refractive power positioned on the incident side, said second lens component being a biconvex lens, said third lens component being a negative lens having a concave surface of large negative refractive power positioned toward said second lens component, said fourth lens component being a positive lens. Said rear lens group comprises a fifth and sixth lens components, said fifth lens component being a positive meniscus lens, said sixth lens component being a positive meniscus lens which is approximately hemispherical. Besides, the objective for video disks according to the present invention is arranged to satisfy the following conditions when reference symbol $f$ represents the focal length of the lens system as a whole, reference symbol $f_F$ represents the total focal length of the front lens group, reference symbol $f_R$ represents the total focal length of the rear lens group, and reference symbol $d_8$ represents the airspace between the front and rear lens groups.

$$0.6 \geq d_8/f \geq 0.3 \tag{1}$$

$$1.08 \geq f_R/f \geq 0.82 \tag{2}$$

$$3.9 \geq f_F/f_R \geq 2.9 \tag{3}$$

In the lens system as described in the above, the front lens group is arranged to chiefly correct chromatic aberration, and it is possible to correct chromatic aberration by making refractive indices of lenses having negative refractive powers different from refractive indices of lenses having positive refractive powers or by making refractive indices of lenses having negative refractive powers large. For example, it is desirable to make the difference $n_1 - n_2$ between the refractive index $n_1$ of the first lens component and refractive index $n_2$ of the second lens component as $n_1 - n_2 > 0.15$ and the difference $n_3 - n_4$ between the refractive index $n_3$ of the third lens component and refractive index $n_4$ of the fourth lens component as $n_3 - n_4 > 0.15$ and to make Abbe's numbers $\nu_1$, $\nu_2$, $\nu_3$ and $\nu_4$ of the first, second, third and fourth lens components respectively as $\nu_1 < 40$, $\nu_2 < 55$, $\nu_3 < 40$ and $\nu_4 < 55$. When, however, refractive indices $n_1$ and $n_3$ of lenses having negative refractive powers are made too large, transparency will decrease in case of some kinds of glass materials. Therefore, especially for dense flint type glass materials, it is necessary to make said refractive indices $n_1$ and $n_3$ 1.7 or less.

The rear lens group is to converge the rays from the front lens group and, therefore, the energy per unit area of rays which pass through each lens component will become high. So, it is necessary to prevent deterioration of the lens system by using, for example, fused quartz as lens material.

Besides, it is possible to correct aberrations of the lens system most favourably when the ratio of the total focal length $f_R$ of the rear lens group to the focal length $f$ of the lens system as a whole is selected as $1.08 \geq f_R/f \geq 0.82$, the ratio of the total focal length $f_F$ of the front lens group to the total focal length $f_R$ of the rear lens group is selected as $3.9 \geq f_F/f_R \geq 2.9$, and the airspace between the front and rear lens groups is selected as $0.6 \geq d_8/f \geq 0.3$ as described before.

If it becomes $r_R/f > 1.08$ in the condition (2) related to the rear lens group, spherical aberration will be undercorrected. If, on the contrary, it becomes $f_R/f < 0.82$, spherical aberration will be overcorrected.

If it becomes $f_F/f_R > 3.9$ in the condition (3), chromatic aberration of spherical aberration will be aggravated and, moreover, coma will be undercorrected. If it becomes $f_F/f_R < 2.9$, coma will be somewhat overcorrected.

If it becomes $d_8/f > 0.6$ in the condition (1), offaxial aberrations, especially distortion, will become large. As a result, errors in information will be caused when the recorded signals are picked up by a different reproducing lens system. If it becomes $d_8/f < 0.3$, astigmatic difference will become large and, consequently, errors will be caused in the same way as above when reproducing the recorded signals.

The objective for video disks according to the present invention shown in FIG. 1 is to be used for recording the rays from a light source located at a position of limited distance. When, however, a concave lens component $L_0$ having the focal point located at the position of the light source is additionally provided on the incident side of the lens system, the lens system for rays from the light source at a limited distance shown in FIG. 1 can be used also for rays from infinite distance without making any other alteration in the lens system. When making a video disk, the lens system is moved in radial direction of the video disk. Therefore, in case of rays from the light source at a limited distance, it is necessary to move the light source together with the lens system. When, however, recording the rays from infinite distance by arranging the lens system as shown in FIG. 4, only the lens system is to be moved and the light source may be kept fixed.

BRIEF DESCRIPTION OF THE DRAWINGS

FIG. 1 shows a sectional view of the objective according to the present invention;

FIGS. 2A, 2B, 2C and 2D respectively show graphs illustrating aberration curves of the Embodiment 1 of the present invention;

FIGS. 3A, 3B, 3C and 3D respectively show graphs illustrating aberration curves of the Embodiment 2 of the present invention; and FIG. 4 shows a sectional view of the objective according to the present invention in case that an additional lens component is added for the purpose of using the objective for incident rays from infinite distance.

DETAILED DESCRIPTION OF THE PREFERRED EMBODIMENTS

Preferred embodiments of the objective for video disks according to the present invention having lens configuration as explained in the above and satisfying the respective conditions given in the above are as shown below.

Embodiment 1

$f = 1.0$ ($\lambda = 441.6$ nm)
$r_1 = 1.1559$
  $d_1 = 0.1648$    $n_1 = 1.69827$    $\nu_1 = 32.1$
$r_2 = 0.8890$
  $d_2 = 0.1630$
$r_3 = 1.2571$
  $d_3 = 0.4084$    $n_2 = 1.52564$    $\nu_2 = 64.1$
$r_4 = -3.3910$
  $d_4 = 0.1648$
$r_5 = -1.2088$
  $d_5 = 0.1575$    $n_3 = 1.69827$    $\nu_3 = 32.1$
$r_6 = \infty$
  $d_6 = 0.0238$
$r_7 = 12.5110$
  $d_7 = 0.4524$    $n_4 = 1.49549$    $\nu_4 = 70.1$
$r_8 = -1.1727$
  $d_8 = 0.4286$
$r_9 = 0.9474$
  $d_9 = 0.3425$    $n_5 = 1.49549$    $\nu_5 = 70.1$
$r_{10} = 3.0668$
  $d_{10} = 0.1465$
$r_{11} = 0.4277$
  $d_{11} = 0.2821$    $n_6 = 1.46654$    $\nu_6 = 67.8$
$r_{12} = 1.1172$
$\beta = -1/40$,    $S_1 = 39.04$,    $S = 0.274$
$f_F = 3.226$,    $f_R = 0.963$ Embodiment 2

$f = 1.0$ ($\lambda = 441.6$ nm)
$r_1 = 1.1516$
  $d_1 = 0.1648$    $n_1 = 1.69827$    $\nu_1 = 32.1$
$r_2 = 0.8888$
  $d_2 = 0.1648$
$r_3 = 1.2917$
  $d_3 = 0.4193$    $n_2 = 1.52564$    $\nu_2 = 64.1$
$r_4 = -3.1101$
  $d_4 = 0.1648$
$r_5 = -1.2055$
  $d_5 = 0.1502$    $n_3 = 1.69827$    $\nu_3 = 32.1$
$r_6 = 129.5733$
  $d_6 = 0.0220$
$r_7 = 9.9354$
  $d_7 = 0.4450$    $n_4 = 1.49549$    $\nu_4 = 70.1$
$r_8 = -1.1665$
  $d_8 = 0.5127$
$r_9 = 0.9092$
  $d_9 = 0.3113$    $n_5 = 1.49549$    $\nu_5 = 70.1$
$r_{10} = 2.1511$
  $d_{10} = 0.1135$
$r_{11} = 0.4547$
  $d_{11} = 0.2985$    $n_6 = 1.52564$    $\nu_6 = 64.1$
$r_{12} = 1.1978$
$\beta = -1/40$,    $S_1 = 38.956$,    $S = 0.273$
$f_F = 3.255$,    $f_R = 0.94$ In the above-mentioned respective embodiments, reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses for $\lambda = 441.6$, reference symbols $\nu_1$ through $\nu_6$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

Aberration curves of respective embodiments shown in the above are illustrated in FIGS. 2A, 2B, 2C and 2D and in FIGS. 3A, 3B, 3C and 3D. In these figures, $\lambda_0$, $\lambda_0$ and $\lambda_2$ for spherical aberration and OSC' are respectively $\lambda_0 = 441.6$, $\lambda_1 = 457.9$, and $\lambda_2 = 480.0$.

Now, an example of numerical values of the lens component $L_O$ to be added in case of rays from infinite distance as shown in FIG. 4 is shown below for the case that said lens component $L_0$ is added to the Embodiment 1.

$r_0 = -5.0624$
$d_0 = 0.3626$      $n_0 = 1.52564$      $\nu_0 = 64.1$
$r_0' = -7.0802$
$d_0' = 0.3662$

In the above, reference symbols $r_0$ and $r_0'$ respectively represent radii of curvature of respective surfaces of the lens component $L_0$, reference symbols $d_0$ and $d_0'$ respectively represent the thickness of the lens component $L_0$ and airspace between the lens component $L_0$ and front lens surface $r_1$ of the lens system according to Embodiment 1, reference symbol $n_0$ represents refractive index of the lens component $L_0$ for $\lambda = 441.6$, and reference symbol $\nu_0$ represents Abbe's number of the lens component $L_0$ for $d$ line.

Said additional lens component $L_0$ is so arranged that its focal point comes to the position of the light source. For correction of aberrations, however, it is more desirable to further arrange so that the concave surface of the lens component $L_0$ is positioned toward the light source as shown in FIG. 4.

I claim:

1. An objective for video disks comprising a front lens group and rear lens group, said front lens group comprising a first, second, third and fourth lens components, said rear lens group comprising a fifth and sixth lens components, said first lens component being a negative meniscus lens, said second lens component being a biconvex lens, said third lens component being a negative lens, said fourth lens component being a positive lens, said fifth lens component being a positive meniscus lens, said sixth lens component being a positive meniscus lens, said objective for video disks satisfying the following conditions:

$$0.52 \geq d8/f \geq 0.42 \quad (1)$$

$$0.97 \geq f_R/f \geq 0.93 \quad (2)$$

$$3.5 \geq f_F/f_R \geq 3.3 \quad (3)$$

wherein reference symbol $f$ represents the focal length of the lens system as a whole, reference symbol $f_F$ represents the total focal length of the front lens group, reference symbol $f_R$ represents the focal length of the rear lens group, and reference symbol $d_8$ represents the airspace between the front and rear lens groups.

2. An objective for video disks according to claim 1 further comprising a concave lens component and arranged to be usable also for incident rays from infinite distance by adding said concave lens component, said concave lens component being added on the incident side of the objective according to claim 1 and having the focal point located at the position of the light source.

3. An objective for video disks according to claim 1, in which said objective for video disks has the following numerical data:

| $f = 1.0 \ (\lambda = 441.6 \text{ nm})$ | | | |
|---|---|---|---|
| $r_1 = 1.1559$ | | | |
| | $d_1 = 0.1648$ | $n_1 = 1.69827$ | $\nu_1 = 32.1$ |
| $r_2 = 0.8890$ | | | |
| | $d_2 = 0.1630$ | | |
| $r_3 = 1.2571$ | | | |
| | $d_3 = 0.4084$ | $n_2 = 1.52564$ | $\nu_2 = 64.1$ |
| $r_4 = -3.3910$ | | | |
| | $d_4 = 0.1648$ | | |
| $r_5 = -1.2088$ | | | |
| | $d_5 = 0.1575$ | $n_3 = 1.69827$ | $\nu_3 = 32.1$ |
| $r_6 = \infty$ | | | |
| | $d_6 = 0.0238$ | | |
| $r_7 = 12.5110$ | | | |
| | $d_7 = 0.4524$ | $n_4 = 1.49549$ | $\nu_4 = 70.1$ |
| $r_8 = -1.1727$ | | | |
| | $d_8 = 0.4286$ | | |
| $r_9 = 0.9474$ | | | |
| | $d_9 = 0.3425$ | $n_5 = 1.49549$ | $\nu_5 = 70.1$ |
| $r_{10} = 3.0668$ | | | |
| | $d_{10} = 0.1465$ | | |
| $r_{11} = 0.4277$ | | | |
| | $d_{11} = 0.2821$ | $n_6 = 1.46654$ | $\nu_6 = 67.8$ |
| $r_{12} = 1.1172$ | | | |
| $\beta = -1/40$, | $S_1 = 39.04$, | | $S = 0.274$ |
| $f_F = 3.226$, | $f_R = 0.963$ | | | wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses for $\lambda = 441.6$, reference symbols $\nu_1$ through $\nu_6$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

4. An objective for video disks according to claim 1, in which said objective for video disks has the following numerical data:

| $f = 1.0 \ (\lambda = 441.6 \text{ nm})$ | | | |
|---|---|---|---|
| $r_1 = 1.1516$ | | | |
| | $d_1 = 0.1648$ | $n_1 = 1.69827$ | $\nu_1 = 32.1$ |
| $r_2 = 0.8888$ | | | |
| | $d_2 = 0.1648$ | | |
| $r_3 = 1.2917$ | | | |
| | $d_3 = 0.4193$ | $n_2 = 1.52564$ | $\nu_2 = 64.1$ |
| $r_4 = -3.1101$ | | | |
| | $d_4 = 0.1648$ | | |
| $r_5 = -1.2055$ | | | |
| | $d_5 = 0.1502$ | $n_3 = 1.69827$ | $\nu_3 = 32.1$ |
| $r_6 = 129.5733$ | | | |
| | $d_6 = 0.0220$ | | |
| $r_7 = 9.9354$ | | | |
| | $d_7 = 0.4450$ | $n_4 = 1.49549$ | $\nu_4 = 70.1$ |
| $r_8 = -1.1665$ | | | |
| | $d_8 = 0.5127$ | | |
| $r_9 = 0.9092$ | | | |
| | $d_9 = 0.3113$ | $n_5 = 1.49549$ | $\nu_5 = 70.1$ |
| $r_{10} = 2.1511$ | | | |
| | $d_{10} = 0.1135$ | | |
| $r_{11} = 0.4547$ | | | |
| | $d_{11} = 0.2985$ | $n_6 = 1.52564$ | $\nu_6 = 64.1$ |
| $r_{12} = 1.1978$ | | | |
| $\beta = -1/40$, | $S_1 = 38.956$, | | $S = 0.273$ |
| $f_F = 3.255$, | $f_R = 0.94$ | | | wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses for $\lambda = 441.6$, reference symbols $\nu_1$ through $\nu_6$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol $S$ represents the distance from the rear lens surface of the lens system to the recording surface.

* * * * *